April 28, 1936.   A. H. LAMB   2,039,230
ILLUMINATION CONTROL DEVICE
Filed May 10, 1934
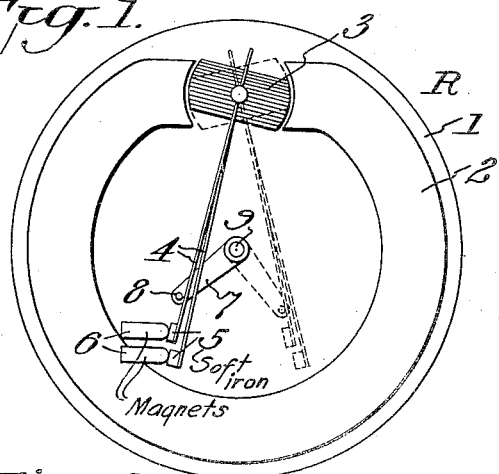
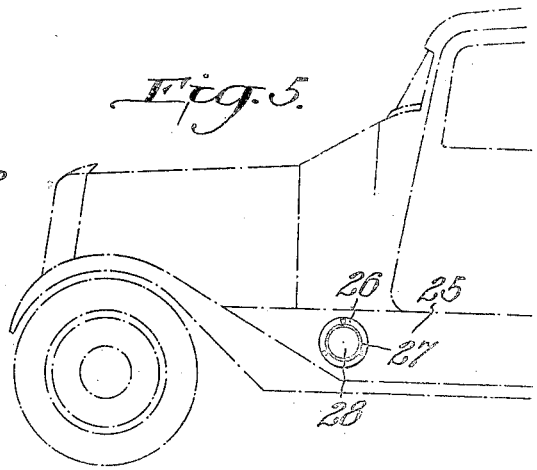
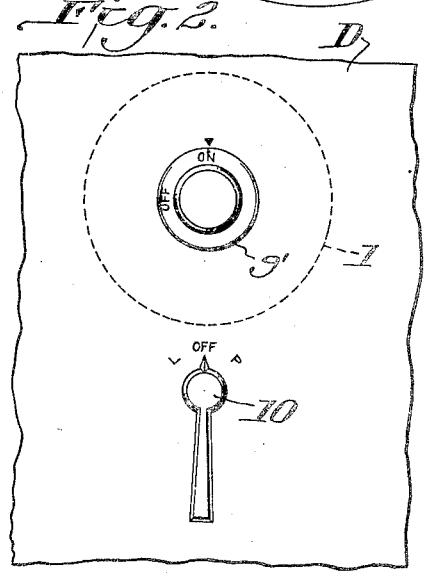
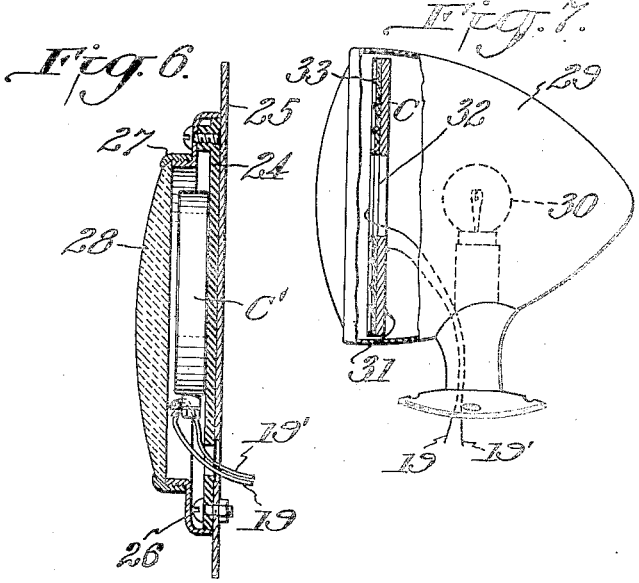
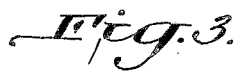
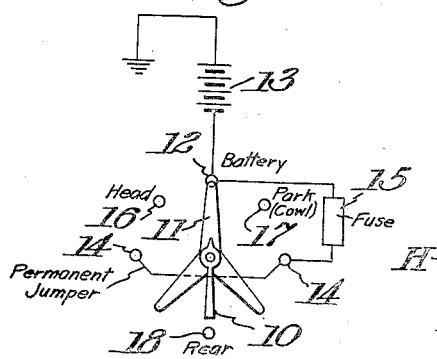
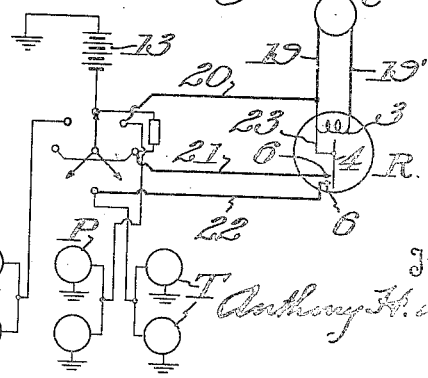
Inventor:
Anthony H. Lamb,
By Potter, Pierce & Scheffler,
Attorneys.

Patented Apr. 28, 1936

2,039,230

UNITED STATES PATENT OFFICE 2,039,230

ILLUMINATION CONTROL DEVICE

Anthony H. Lamb, Elizabeth, N. J., assignor to Weston Electrical Instrument Corporation, Newark, N. J., a corporation of New Jersey Application May 10, 1934, Serial No. 725,018

15 Claims. (Cl. 171—97)

This invention relates to illumination control devices and more particularly to a semi-automatic light switch for turning on the parking lights of an automobile when the natural or solar illumination falls below a predetermined value.

Various arrangements have been proposed for the automatic control of automobile lights but, for several reasons, none of the proposed systems has met with any commercial success. The prior controls have usually required more than one relay or switch and the photocells, usually of the selenium resistance type, and/or relays have imposed a continuous drain on the automobile battery. The wiring systems for associating the prior automatic controls with the customary circuits of the automobile have been relatively complicated, and the placing of the equipment, such as relays, resistors, etc., back of the panel board has been difficult and inconvenient. In most instances there was the further objection that it was necessary to make comparatively extensive changes in the original wiring of the automobile lighting system.

An object of the present invention is to provide a simple and economical illumination control for the lights of an automobile or other vehicle. An object is to provide a semi-automatic illumination control for vehicle lights which restricts the current drain on the battery to that current which is usefully employed for illumination. A further object is to provide a vehicle lighting system which includes the usual multiple-position switch for controlling the lights in the customary manner and a semi-automatic control device which, under predetermined conditions, will turn on the parking lights irrespective of setting of the multiple-position switch. A further object is to provide a novel arrangement of the photocell which avoids the use of a separate waterproof container mounted outside the vehicle or the mounting of the cell at the inner side of the windows.

These and other objects of the invention will be apparent from the following specification when taken with the accompanying drawing, in which:

Fig. 1 is a somewhat diagrammatic rear view of the relay element of a control embodying the invention;

Fig. 2 is a fragmentary front elevation, on a smaller scale, of the dashboard or panel board of a vehicle, and including a front view of the manually adjustable element of the semi-automatic control system;

Fig. 3 is a circuit diagram of a conventional type of automobile lighting switch, the wiring of the switch, battery and fuse being shown;

Fig. 4 is a circuit diagram of a vehicle lighting system including a switch as shown in Fig. 3 and a semi-automatic control system;

Fig. 5 is a fragmentary side elevation of a vehicle showing one arrangement of the photocell element on the vehicle body;

Fig. 6 is a central section through the photocell element of Fig. 5; and

Fig. 7 is a side elevation, with parts in section, of a cowl light housing within which a photocell is mounted.

According to the present invention, the only elements which need be added to a conventional vehicle illumination system to turn on lights automatically are a photocell of the current generating type and a sensitive relay capable of developing reliable current-carrying contact engagements when the contacts are closed. Relays of the type which I prefer to employ are described and claimed in my copending application Ser. No. 688,696, filed Sept. 8, 1933, and include a moving system having a pointer carrying a magnetic rider for cooperation with a relatively stationary permanent magnet. The magnetic attraction reinforces the contact pressure established by current flow through the coil of the moving system and insures a reliable contact engagement which renders a secondary or auxiliary relay unnecessary, but it is to be understood that the conventional arrangement of a sensitive relay and a secondary relay may be used to close the illumination circuit.

The essential parts of a preferred form of relay R are shown in Fig. 1, and include a base I carrying a permanent magnet 2 and the pivotally mounted coil 3 which has a double pointer or contact arms 4, 4. These elements constitute a sensitive milliammeter and the coil 3 is so connected to the photocell C, Fig. 4, that an increase in current flow tends to rotate the moving system in a counter-clockwise direction, as viewed in Fig. 1.

The contact arms carry small riders 5 of soft iron and a pair of small permanent magnets 6, of cobalt steel or the like, are mounted on the base I for cooperation with the magnetic riders or contacts 5 of the moving coil system. The magnets are so positioned on the base that the soft iron riders enter the effective field of the magnets when the current flow through the coil 3 falls to a relatively low value corresponding, for example, to about 5 foot candles at the photocell. The attraction exerted by the magnets is so great that reliable contact engagements are obtained in a sensitive relay of the instrument type, and these contacts are not broken by increased current flow through oil 3 but by a pusher arm 7 which is pivotally supported on the base and has a pin 8 for forcing the contact arms 4, 4 away from the magnets. The base 1 of the relay may be mounted at the rear of an automobile instrument panel or dashboard D and the shaft 9 which provides the pivotal support for the pusher arm 7 extends through the panel and carries a knob 9' for the manual adjustment of the pusher arm. With the control knob 9' and the pusher arm 7 in the positions shown in Figs. 1 and 2, the moving system of the relay is free to move in response to current flow from the photocell and, as shown in solid lines, the contact arms 4, 4 have been drawn to the magnets to close a circuit between the same, it being understood that the contact arms 4, 4 are metallic and capable of carrying the current required for the parking lights of the vehicle. When the knob 9' is turned clockwise to the "off" position, the pusher arm 7 is rotated into the position shown in dotted lines in Fig. 1 and the contact arms 4, 4 are thereby forced away from the magnets 6, 6 to open the relay contacts and to prevent a closure of the same so long as the knob 9' remains in the "off" position.

When the control handle 10 of the usual multiple-position illumination control switch is mounted on the instrument panel D, it is convenient to place the control knob 9' of the automatic control system adjacent the handle 10. This simplifies the wiring of the automatic control to the vehicle circuits, but the invention is not restricted to the particular arrangement shown in Fig. 2 as the appropriate connections may be made when the light control switch is mounted on the steering wheel.

As shown in Fig. 2, the handle 10 may be turned to opposite sides of its "off" position to close the main lighting circuits or to close a parking light circuit, and the panel may carry legends, such as "L" and "P" to indicate these operating positions of the handle 10. A conventional wiring diagram for this type of multiple-position switch is shown in Fig. 3. The switch includes a series of fixed contacts positioned for engagement by the three arms of a movable contact 11, one fixed contact 12 being connected to one terminal of the battery 13. A pair of contacts 14 are connected to each other and through a fuse 15 to the contact 12. The headlight contact 16, the parking light contact 17 and the tail light contact 18 are arranged between adjacent pairs of line contacts 12, 14 and 14, 14, and in such relative positions that a rocking of the movable contact 11 in a clockwise direction energizes only the parking light contact 17, while both the headlight and tail light contacts are energized when the movable contact arm is turned in the opposite direction. The headlights H, parking lights P and tail lights T are connected between their respective switch contacts and the frame of the vehicle, and the second battery terminal is also grounded on the vehicle frame.

The complete wiring of the original lighting system and the automatic control is shown in Fig. 4, the circuits or connections added for the installation of the automatic control being shown in heavy lines. The terminals of the photocell C are connected across the moving coil 3 by leads 19, 19', and the lead 19 is connected to the parking light contact 17 of the switch by a lead 20. One relay contact 6 is connected to a contact 14 of the switch by a lead 21, and the second contact 6 is connected to the tail light contact by a lead 22. The wiring of the relay includes a jumper 23 between the contact arms 4, 4 and that terminal of the coil 3 to which lead 19 is connected.

It will be apparent that the engagement of the magnetic contacts 5 of the moving system with the permanent magnets 6, as shown in full lines in Fig. 1, completes circuits for the cowl lights P and the tail lights T.

The photocell C should be protected from the weather and it has been proposed to mount the same in a waterproof box outside the vehicle body or to mount the cell at the inner side of one of the windows. One convenient method of mounting a current generating cell of the solid type is shown in Figs. 5 and 6. The casing C' which houses the photocell is attached to a mounting plate 24 which can be secured to a desired position on the vehicle body, and preferably adjacent the left hand running board, as shown at Fig. 5. The only openings which need be made in the vehicle shell 25 are a series of small holes for receiving the attaching bolts and a somewhat larger opening for the connecting leads 19, 19'. An ornamental ring member 26 is secured to the mounting plate 24 and has a threaded flange for receiving the clamping ring 27 which secures the protective glass cover or lens 28 in place to complete the protective housing for the cell.

A simpler and preferred arrangement is to mount the photocell within one of the light casings, such as the cowl light casing 29. When the cell is placed in front of the light bulb 30, the cell has the form of an annular disk to prevent blocking of light beams from the light bulb 30. The cell is of the current generating type and includes a back electrode 31, a layer of actinoelectric material 32, and a collecting electrode such as the grid 33. The leads 19, 19' for connecting the cell to the relay may pass through the base of the lamp casing to the interior of the car adjacent the dashboard. The cell may also be located at the rear of the lamp 30 since the increased illumination at the cell resulting from a closure of the relay contacts will not effect an opening of the relay contacts as these are held in closed position by magnetic attraction.

The control knob 9' is normally left at the "off" position to prevent a closure of the relay contacts. When the automatic control is desired, the knob 9' is turned to the "on" position to release the moving system, thus permitting it to move in response to the current output of the cell C. So long as the natural illumination is above a predetermined value, the contact arms 4, 4 are held away from the magnets 6, 6 but the relay closes automatically when the illumination falls below that critical value. The closing of the relay contacts completes the circuits of the cowl and tail lights, and these remain on until the control knob 9' is adjusted manually to open the relay contacts.

It is to be understood that the particular circuit arrangement shown in Fig. 4 illustrates one typical embodiment of the invention, and that somewhat different arrangements may be preferable when the original wiring and switch of the vehicle are of different design. For example, when the vehicle is provided with a single parking light that is controlled from the main switch or an auxiliary parking light switch, only two leads will be required to connect the relay contacts in parallel with the parking switch contacts.

I believe that it is broadly new to provide an illumination control for vehicle lights which includes light-responsive means for energizing the light circuit or circuits, means for yieldingly maintaining current flow through the circuit or circuits upon the initial energization thereof, and a manually adjustable control for opening the circuit or circuits which were automatically closed by the light-responsive means. It is therefore to be understood that the invention is not limited to the particular circuits and combinations of parts herein illustrated and described, as various changes in the circuits and in the construction and arrangements of the circuit elements thereof fall within the spirit of my invention as set forth in the following claims.

I claim:

1. A vehicle lighting system comprising the combination with a battery, a plurality of sets of lights, and manually operated switch means for connecting said sets of lights to said battery, one of said sets of lights being parking lights, of automatic means operative independently of the manually-set position of said switch means for connecting said parking lights to said battery when the illumination at the vehicle falls below a critical value; said automatic means comprising a photocell of the current-generating type, a relay having a moving system responsive to the current output of said photocell and adapted to close a pair of contacts, one contact being mounted on said moving system and the other being stationary, and circuit connections including said relay contacts for completing a circuit including said battery and said parking light.

2. A vehicle lighting system as claimed in claim 1, wherein said first relay contact is a magnetic rider on said moving system and the stationary contact is a permanent magnet, and wherein said relay includes a pusher arm for separating said relay contacts.

3. A vehicle lighting system as claimed in claim 1, wherein said manually operated switch means comprises a contact arm and a contact for each set of lights, and the said circuit connections consist of leads from said relay contacts to said contact arm and the parking light contact, respectively, of said switch means.

4. The combination with a vehicle having light housings mounted thereon, lights in said housings, a battery, a manually-operated switch for completing a circuit including said battery and said lights, and means automatically connecting said lights to said battery when the illumination at said vehicle falls below a critical value; said means comprising a photocell, a relay responsive to the current output of the photocell and having a pair of contacts, and a circuit including said battery and lights in series with said relay contacts.

5. The invention as claimed in claim 4, wherein said relay includes means operative upon an engagement of said relay contacts for yieldingly locking the same in engagement with a force exceeding that resulting from current flow through said relay, and means manually operative at will for separating said relay contacts.

6. The invention as claimed in claim 4, wherein said relay is mounted at the rear of the instrument panel of the vehicle, and one contact of said relay is a permanent magnet and the other is of magnetic material, in combination with a pusher arm for separating said magnetic contacts from each other, and a manual control at the face of said instrument panel for actuating said pusher arm.

7. A vehicle illumination system comprising the combination with a vehicle lighting system including a battery, a plurality of sets of lights including at least one parking light, and a manually operated switch adapted to be adjusted to a plurality of positions to energize one or alternatively more than one of said sets of lights from said battery, of a light-responsive control means operative independently of said switch to control said parking light; said control means comprising a photocell of the current-generating type, a relay having a moving coil connected across said photocell and a pair of contacts, one contact being stationary and the other carried by said moving system, and circuit connections between said control means and said vehicle lighting system, said circuit connections consisting of leads from said relay contacts to said manually operated switch.

8. The invention as claimed in claim 7, wherein said relay includes means for yieldingly locking said relay contacts in engagement upon an initial engagement thereof, and means operable manually to separate said relay contacts.

9. An illumination control system comprising a lighting circuit including a source of current and a light bulb, a pair of contacts comprising a switch in said lighting circuit, a photocell, and a milliammeter including a coil connected across said photocell, a contact carried by said coil, and a relatively stationary contact positioned for engagement by said coil-carried contact when the current output of said photocell falls below a predetermined value.

10. The invention as claimed in claim 9, wherein one contact is a permanent magnet and the other is of magnetic material, in combination with means adjustable to alternative positions to permit free movement of said movable system in response to the current output of said photocell or alternatively to retain the contact of said movable system in a position corresponding substantially to maximum current flow through the coil of said moving system.

11. In a vehicle illumination system, the combination with a plurality of sets of lights, a battery, and a multiple-position switch adjustable manually to energize a desired set or alternatively a desired group of said sets of lights, of light-responsive control means operable independently of said switch for energizing a desired one of said sets of lights; said control means including a photocell, a relay of the instrument type having a pair of contacts controlled by the current output of said photocell, circuit connections between said relay contacts and respectively said battery and the predetermined set of lights, and means manually adjustable to retain said relay contacts in the positions corresponding to maximum current flow through said relay.

12. The combination with a vehicle lighting system including a plurality of sets of lights, a source of current, and a switch manually operable to control current flow to said sets of lights, said switch including a movable contact arm and a plurality of contacts, of means operable independently of the adjustment of the contact arm of said switch to establish a shunt circuit between certain contacts of said switch to energize a predetermined set of said lights when the illumination at the vehicle falls below a critical value, said means comprising a photocell, a relay having a moving system responsive to the current output of said cell, relay contacts adapted to be brought into engagement by said moving system, and circuit connections between said relay contacts and said certain contacts of said switch.

13. The invention as claimed in claim 12, in combination with means manually adjustable to retain the moving system of said relay in a fixed position with the said relay contacts out of engagement.

14. The invention as claimed in claim 12, in combination with means yieldingly retaining said relay contacts in engagement with a force exceeding that developed by said moving system in response to current flow through said relay.

15. The invention as claimed in claim 12, in combination with means yieldingly retaining said relay contacts in engagement with a force exceeding that developed by said moving system in response to current flow through said relay, and means manually operable to separate said relay contacts.

ANTHONY H. LAMB.